US007984880B2

(12) United States Patent
Gomes (10) Patent No.: US 7,984,880 B2
(45) Date of Patent: Jul. 26, 2011

(54) MECHANISMS AND METHODS FOR PROVIDING RUDDER CONTROL ASSIST DURING SYMMETRICAL AND ASYMMETRICAL THRUST CONDITIONS

(75) Inventor: Ierko de Magalhaes Gomes, São José dos Campos (BR)

(73) Assignee: Embraer-Empresa Brasileira de Aeronautica S.A., Sao Jose dos Campos-SP (BR)

( * ) Notice: Subject to any disclaimer, the term of this patent is extended or adjusted under 35 U.S.C. 154(b) by 828 days.

(21) Appl. No.: 11/869,219

(22) Filed: Oct. 9, 2007

(65) Prior Publication Data
US 2009/0090816 A1    Apr. 9, 2009

(51) Int. Cl.
*B64C 13/28* (2006.01)
*B64C 13/04* (2006.01)
*B64C 13/46* (2006.01)

(52) U.S. Cl. .......... 244/230; 244/223; 244/87; 244/99.3

(58) Field of Classification Search .................. 244/235, 244/233, 232, 230, 223, 221, 220, 192, 99.9, 244/99.5, 99.3, 99.2, 88, 87, 76 A, 75.1
See application file for complete search history.

(56) References Cited

U.S. PATENT DOCUMENTS

| 1,855,093 | A | * | 4/1932 | Bruce et al. | .................... | 244/223 |
| 2,597,020 | A | * | 5/1952 | Nissen | .................... | 244/76 A |
| 4,648,569 | A | * | 3/1987 | Stewart | .................... | 244/76 R |
| 2005/0116095 | A1 | | 6/2005 | Cline et al. | | |

FOREIGN PATENT DOCUMENTS

GB            395259      *   7/1933
* cited by examiner

*Primary Examiner* — Tien Dinh
*Assistant Examiner* — Richard R Green
(74) *Attorney, Agent, or Firm* — Nixon & Vanderhye P.C.

(57) ABSTRACT

Rudder assist mechanisms and methods are capable of being operably connected to an aircraft's rudder control system. The rudder assist mechanisms most preferably have over-the-center spring biasing functions so as to cause either substantially no spring force (i.e., when the linkage is over the spring-bias center) or substantially all spring force (i.e., when the linkage is left or right of the spring-bias center) to be exerted on the rudder control system. The rudder assist mechanism may include a control spring assembly, and a linkage assembly which operably connects the control spring assembly to the rudder control assembly. The linkage assembly is moveable operably between a null position wherein substantially no spring force of the control spring assembly is transferred to the rudder control system by the linkage assembly, and right and left spring-biased positions wherein right and left spring forces of the control spring assembly are transferred to the rudder control system, respectively. The null position may therefore establish a dead zone of rudder deflection within a selected range of right and left rudder control surface deflection angles. Thus, right and left spring forces may be transferred to the rudder control system when the rudder control surface is deflected at an angle which exceeds the selected range of deflection angles. Some embodiments include an actuator unit which is operably capable of moving the spring assembly and the linkage assembly connected thereto between a thrust symmetrical mode (TSM) condition and a thrust asymmetrical mode (TAM) condition so as to cause different spring forces to be exerted on the rudder control system in such different thrust conditions.

15 Claims, 9 Drawing Sheets

MECHANISMS AND METHODS FOR PROVIDING RUDDER CONTROL ASSIST DURING SYMMETRICAL AND ASYMMETRICAL THRUST CONDITIONS

TECHNOLOGICAL FIELD

The disclosed systems and methods relate generally to the field of aircraft control. In especially preferred implementations, the disclosed systems and methods provide for aircraft rudder assist (boost) suitable for use with reversible aircraft rudder control systems during both symmetrical and asymmetrical thrust conditions.

BACKGROUND AND SUMMARY

It is well known that an aircraft in flight is commanded through three axes of control, namely the pitch, roll and yaw axes. Control surfaces on the aircraft structure are thus commanded by a pilot (or autopilot if so equipped) to move in appropriate directions so the aircraft attitude may be controllably adjusted relative to such axes of control to thereby allow control over the aircraft's flight path. In conventional aircraft, control of the aircraft about the yaw axis is typically accomplished through foot pedals in the aircraft cockpit which when manipulated by the pilot's feet cause an aircraft rudder to be deflected and thereby yaw the aircraft in the desired direction. Thus, pressing the right rudder pedal will cause the rudder control surface to be deflected rightward thereby responsively causing the aircraft to yaw rightward. Conversely, pressing the left rudder pedal will cause the rudder control surface to be deflected leftward thereby responsively causing the aircraft to yaw leftward.

Aircraft which are provided with reversible flight controls (that is, a flight control system wherein movement of the control surface will back-drive the pilot's control in the cockpit) may have certain limitations. For example, such reversible flight controls may have maximum rudder pedal force requirements that can lead to severe restrictions at minimum aircraft control speed (Vmc) thereby causing significant degradation on aircraft field length performance. One traditional aerodynamic solution to maximum rudder pedal force requirements is to employ the rudder tab surface automatically under autotab operation so as to avoid Vmc rudder force restrictions. However, excessive autotab gearing values may cause non-linearity of the pedal forces and also may reduce rudder efficiency.

Rudder control systems are also desirable which assist the pilot to compensate for thrust asymmetry caused by an engine failure. Specifically, it is desirable to allow a pilot to command substantial rudder deflection in an asymmetrical thrust situation so as to counteract adverse aircraft yaw that is caused by the thrust asymmetry (i.e., so as to achieve a controllable side-slip attitude). The advantages of such a system, as compared to a rudder autotab system, include rudder authority maintenance and a lower susceptibility to pedal force relief.

It would be desirable, however, if rudder boost systems were provided which could function so as to limit pilot-induced rudder force during symmetrical thrust conditions (thereby effectively providing maximum rudder input force) while at the same time allowing for such maximum forces to be exceeded when needed during an asymmetrical thrust condition. Such systems would therefore allow maximum rudder input to be observed during symmetrical thrust conditions and prevent for example adverse Vmc aircraft attitudes, yet allow the pilot to obtain the sufficient yaw to achieve an acceptable sideslip angle and maintain flight control during asymmetrical thrust conditions, for example during an engine-out situation. It is towards fulfilling such needs that the present invention is directed.

According to some implementations of the present invention, rudder assist mechanisms are provided which are capable of being operably connected to an aircraft's rudder control system. The rudder assist mechanisms most preferably have over-the-center spring biasing functions so as to cause either substantially no spring force (i.e., when the linkage is over the spring-bias center) or substantially all spring force (i.e., when the linkage is left or right of the spring-bias center) to be exerted on the rudder control system.

One implementation of the invention includes a rudder assist mechanism for operable interconnection with a rudder control system of an aircraft rudder control surface, the rudder assist mechanism comprising a control spring assembly, and a linkage assembly which operably connects the control spring assembly to the rudder control assembly. The linkage assembly is moveable operably between a null position wherein substantially no spring force of the control spring assembly is transferred to the rudder control system by the linkage assembly, and right and left spring-biased positions wherein right and left spring forces of the control spring assembly are transferred to the rudder control system, respectively.

The null position may establish a dead zone of rudder deflection within a selected range of right and left rudder control surface deflection angles. Thus, right and left spring forces may be transferred to the rudder control system when the rudder control surface is deflected at an angle which exceeds the selected range of deflection angles, but not be transferred to the rudder control system when the rudder control surface is deflected at an angle which is within the selected range of deflection angles.

Some implementations of the rudder assist mechanism may include an actuator unit which is operably capable of moving the rudder assist mechanism (e.g., the control spring assembly and the linkage assemble connected thereto) between a thrust symmetrical mode (TSM) condition and a thrust asymmetrical mode (TAM) condition. In response to the actuator unit operably moving the rudder assist mechanism into the TSM condition, the right and left spring forces may be transferred to the rudder control system so as to cause a greater force to be exerted on the rudder control system to effect right and left deflections of the rudder control surface which exceed the selected range of deflection angles. However, in response to the actuator unit operably moving the rudder assist mechanism into the TAM condition, the right and left spring forces may be transferred to the rudder control system so as to cause a lesser force to be exerted on the rudder control system to effect right and left deflections of the rudder control surface which exceed the selected range of deflection angles.

Certain embodiments of the rudder assist mechanism may comprise an engine monitor which issues a signal to the actuator unit indicative of an abnormal thrust condition so as to cause the actuator unit to responsively move the spring and linkage assemblies from the TSM condition to the TAM condition.

According to some implementations, the rudder assist mechanisms may include a control spring assembly having (i) a housing, (ii) a support fork pivotally connected to the housing, (iii) a tension spring having one end pivotally connected to the support fork and an opposite end connected operably to the actuator unit, and (iv) a compression spring having one end pivotally connected to the support fork and an opposite end journally connected to the housing, and a control rod pivotally interconnecting the support fork and the rudder control system.

Each of the tension spring, the compression spring and the control rod may be pivotally connected at a common pivot axis to the support fork. In certain implementations, the control spring assembly will comprise a pair of tension springs each of which has one end connected pivotally to the support fork and an opposite end connected operably to the actuator unit. The actuator unit may therefore include linearly reciprocal actuator rod, and an actuator bell crank connected at one end to the actuator rod and at an opposite end to the compression spring.

An aircraft is provided according to other implementations of the invention and comprises a rudder control surface, a reversible rudder control system operably connected to the rudder control surface to provide physical feedback to a pilot in command of the rudder control surface, and a rudder assist mechanism connected operably to the rudder control system. The rudder assist mechanism may comprise a control spring assembly, and a linkage assembly which operably connects the control spring assembly to the rudder control assembly. According to such implementations, the linkage assembly is therefore preferably moveable operably between a null position wherein substantially no spring force of the control spring assembly is transferred to the rudder control system by the linkage assembly, and right and left spring-biased positions wherein right and left spring forces of the control spring assembly are transferred to the rudder control system, respectively.

The aircraft may comprise an engine monitor and the rudder assist mechanism may further comprise an actuator unit which is operably capable of moving the rudder assist mechanism between a TSM condition and a TAM condition in response to receiving a signal from the engine monitor indicative of an abnormal engine thrust. Preferably, in such implementations, the null position of the rudder assist mechanism establishes a dead zone of rudder deflection within a selected range of right and left rudder control surface deflection angles, and wherein the right and left spring forces are transferred to the rudder control system when the rudder control surface is deflected at an angle which exceeds the selected range of deflection angles.

Other implementations of the invention include methods of providing rudder assist to a rudder control system of an aircraft rudder control surface. Thus, according to certain embodiments, the method will include providing a rudder assist mechanism comprised of a control spring assembly and a linkage assembly, and operably interconnecting the control spring assembly to the rudder control system with a linkage assembly so as to allow the linkage assembly to be moveable operably between a null position wherein substantially no spring force of the control spring assembly is transferred to the rudder control system by the linkage assembly, and right and left spring-biased positions wherein right and left spring forces of the control spring assembly are transferred to the rudder control system, respectively.

In some implementations, the method includes providing the null position of the linkage assembly so as to establish a dead zone of rudder deflection within a selected range of right and left rudder control surface deflection angles, and wherein the right and left spring forces are transferred to the rudder control system when the rudder control surface is deflected at an angle which exceeds the selected range of deflection angles.

The rudder assist mechanism may be caused to assume one of a TSM condition and a TAM condition. According to some aspects, the method includes monitoring a performance parameter of an aircraft engine; issuing a signal to the rudder assist mechanism in response to detecting an abnormal performance parameter of the monitored engine which is indicative of an asymmetrical thrust condition, and causing the rudder assist mechanism to move respectively between the TSM condition and the TAM condition in response to the absence or presence of the signal being issued.

In such implementations, the rudder assist mechanism may comprise an actuator unit which receives the signal indicative of the asymmetrical thrust condition and which is operably connected to the rudder assist mechanism, wherein in the absence of the signal the method comprises causing the actuator to position the rudder assist mechanism in the TSM condition, and wherein in response to receiving the signal, the method comprises causing the actuator unit to move the rudder assist mechanism from the TSM condition to the TAM condition. The rudder mechanism may therefore be caused to assume the TSM condition in the absence of receiving the signal indicative of the asymmetrical thrust condition such that when in the TSM condition, the right and left spring forces of the rudder assist mechanism are transferred to the rudder control system so as to cause a greater force to be exerted on the rudder control system to effect right and left deflections of the rudder control surface which exceed the selected range of deflection angles. Alternatively or additionally, the rudder assist mechanism may be caused to assume the TAM condition in response to receiving the signal, wherein when in the TAM condition, the right and left spring forces are transferred to the rudder control system so as to cause a lesser force to be exerted on the rudder control system to effect right and left deflections of the rudder control surface which exceed the selected range of deflection angles. Thus, the rudder assist mechanism may further comprise an engine monitor which issues a signal to the actuator unit indicative of an abnormal thrust condition so as to cause the actuator unit to responsively move the spring and linkage assemblies from the TSM condition to the TAM condition.

These and other features and advantages will be better and more completely understood by referring to the following detailed description of exemplary non-limiting illustrative implementations in conjunction with the drawings.

BRIEF DESCRIPTION OF THE DRAWINGS

An exemplary non-limiting illustrative implementation of the herein disclosed subject matter will be further explained by reference to the drawings of which.

DETAILED DESCRIPTION

Figure 1:
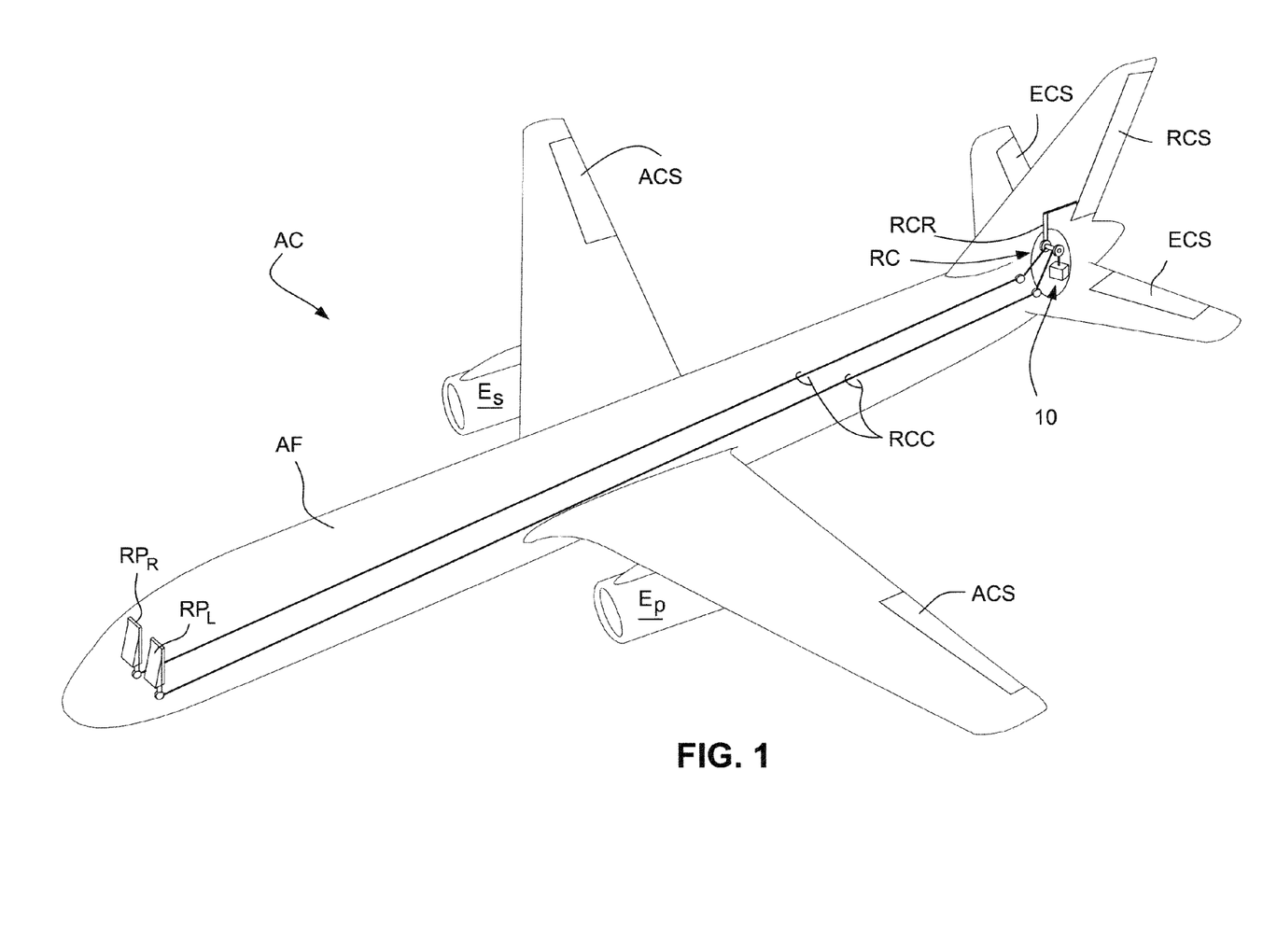
FIG. 1 is a perspective schematic view of a multiengine aircraft which embodies an implementation of a rudder assist mechanism as disclosed herein.

Accompanying FIG. 1 is a schematic view of a conventional multiengine aircraft AC. As depicted, the multiengine aircraft is provided with at least one port engine Ep and at least one starboard engine Es, relative to the aircraft's fuselage AF. As is conventional, the aircraft is provided with wing mounted aileron control surfaces ACS, horizontal stabilizer mounted elevator control surfaces ECS and a vertical stabilizer (tail) mounted rudder control surface RCS so as to achieve control over the aircraft AC relative to its roll, pitch and yaw axes, respectively. For ease of description and clarity, other control surfaces that may be employed in modern aircraft, such as spoilers, flaps, tabs, edge slats, and the like, have been omitted.

The rudder control surface RCS is commanded leftward and rightward by left and right rudder pedals $RP_L$ and $RP_R$, respectively, positioned in the pilot cockpit in the forward area of the aircraft AC. In this regard, it will be understood that dual flight controls are typically provided in modern aircraft so as to allow both a pilot and a copilot to exercise control over the aircraft in dependence on which pilot is tasked with flying the aircraft AC. Thus, although only a single set of rudder pedals RPL and RPR are depicted, it will be appreciated that a second set of comparable rudder pedals would also be provided with comparable functions to those described herein. The rudder pedals RPL and RPR are connected operably to a rudder control system RC at the aft region of the aircraft RC. In this regard, the rudder control system RC is operably connected to a rudder assist mechanism 10 to be described in greater detail below.

Figure 2:
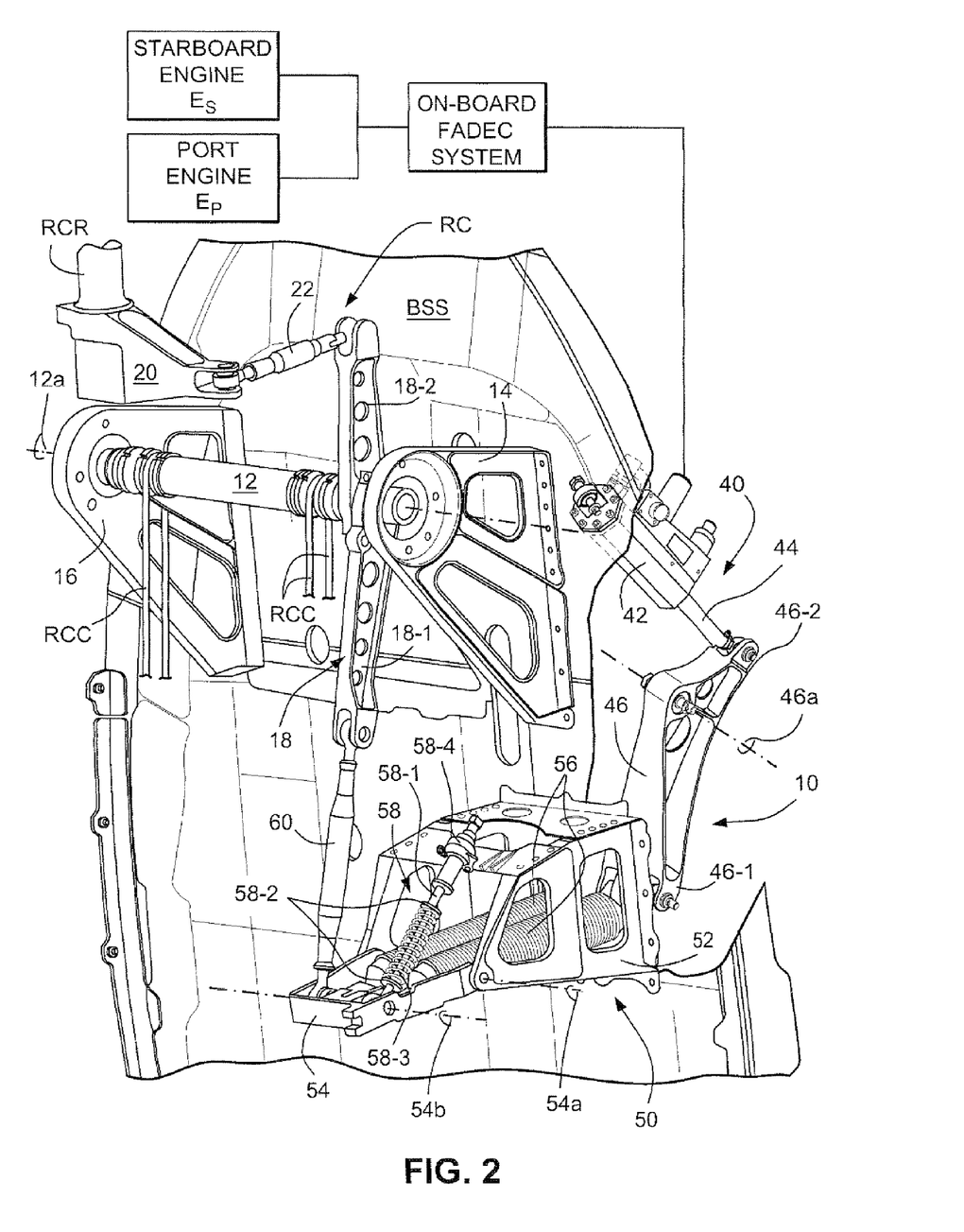
FIG. 2 is a perspective elevational view of a preferred implantation of the rudder assist mechanism as positioned relative to an aircraft's bulkhead support structure near the aircraft tail.

As is perhaps better depicted in FIG. 2, the rudder control system RC includes a rudder torque tube 12 which is supported for pivotal movements about its central elongate axis 12a (which is disposed perpendicular to the aircraft's centerline axis) by means of support brackets 14,16 fixed to the aircraft bulkhead support structure BSS. The rudder torque tube 12 is in turn connected operably to the torque tube bell crank 18 so that the bell crank 18 rotates with the torque tube about its central elongate axis. The lower arm 18-1 of the bell crank 18 is connected to the rudder assist mechanism 10 to be described in detail below, while the upper arm 18-2 of the bell crank 18 is connected operably to the rudder control rod RCR via a drive link 20 and a control rod 22. Therefore, pilot force inputs on the rudder pedals $RP_L$ and $RP_R$ will achieve leftward and rightward movement of the rudder control surface RCS by means of the operable interconnection between the pedals $RP_L$, $RP_R$ and the rudder control rod RCR via the torque tube 12 and its associated bell crank 18.

As is also shown in FIG. 2, the rudder assist mechanism 10 is attached physically to the aircraft's bulkhead support structure BSS and is generally comprised of an actuator assembly 40 and a control spring assembly 50. The actuator assembly 40 is comprised of a hydraulic actuator unit 42 which includes a reciprocally movable linear actuator rod 44. An actuator bell crank 46 operably interconnects the distal end of the actuator rod 44 to the control spring assembly 50 (more particularly to respective ends of the paired tension springs 56). Although not depicted in FIG. 2, the actuator bell crank 46 is mounted to the bulkhead support structure for pivotal movement about its pivot axis 46a.

The actuator rod 44 is depicted in accompanying FIG. 2 as being in a fully extended condition which positions the rudder assist mechanism 10 in a thrust symmetry mode (TSM) condition. The actuator assembly 40 receives an input signal from the aircraft's on-board engine monitoring system, for example an on-board full authority digital engine control (FADEC) system, wherein engine performance parameters for the starboard and port engines Es and Ep, respectively, are monitored. a signal will be issued by the FADEC system to the actuator assembly 40 upon detecting that one of the engines Es, Ep is developing insufficiently low or no thrust as compared to the other of the engines Es, Ep on the aircraft. For a multiengine aircraft having engines mounted laterally relative to the aircraft's fuselage, a condition of low or no thrust of one engine will cause a thrust asymmetry to occur since the other engine(s) are developing their full power at the desired engine setting. As will become more clear from the following discussion, upon receipt of such an input signal, the hydraulic actuator unit 42 will then responsively cause the actuator rod 44 to move linearly to a fully retracted position thereby placing the rudder assist mechanism 10 in a thrust asymmetry mode (TAM) condition. The functioning of the rudder assist mechanism 10 in both the TSM and TAM conditions will be described in greater detail below.

The control spring assembly 50 includes a spring support housing 52 which is fixed to the aircraft's bulkhead support structure BSS. The spring support housing 52 pivotally carries at its forward end a support fork 54. The support fork 54 is thus capable of pivotal movement relative to the support housing 52 about a pivot axis 54a.

A pair of parallel tension springs 56 and a compression spring assembly 58 are operably connected to the support housing 52. In this regard, one end of each of the tension springs 56 is operably pivotally connected to the support fork 54 so as to be pivotal about axis 54b. As will be observed in FIG. 2, the paired tension springs 56 are thus operably pivotally connected to and span the distance between a lower end 46-1 of the actuator bell crank 46 and the support fork 54.

The compression spring assembly 58 includes a connection rod 58-1 which carries a spaced apart pair of flange plates 58-2 between which is positioned a compression spring 58-3. The connection rod 58-1 is connected operably at one end to a journal mount 58-4 fixed to the spring support housing 52 and is pivotally connected at its opposite end to the support fork 54 (i.e., so as to be rotatable about axis 54b). The journal mount 58-4 also allows the connection rod 58-1 to be reciprocally linearly displaced upon pivotal movements of the support fork so as to cause the compression spring 58-3 disposed between the plates 58-3 to be compressed to greater and lesser extents based on lesser and greater spacing therebetween.

The control spring assembly 14 also includes a control rod 60 connected pivotally at one end to the support fork 54 so as to be pivotal about axis 54b and at the other end to the lower end 18-1 of the rudder torque tube bell crank 18. As noted briefly above, the rudder torque tube bell crank 18 is in turn fixed to the rudder torque tube 12 so as to be pivotal as a unit about axis 12a. The upper end 18-2 of the rudder torque tube 18 is pivotally connected to the rudder control rod RCR by means of linkage members 20 and 22.

Accompanying FIGS. 3A-3D schematically depict the general functioning of the rudder assist mechanism 10 described above. In this regard, it will be observed in FIG. 3A that the total spring force is a component resulting from the action of the paired tension springs 56 and the compression spring 58 which is reacted by the control rod 60. Depending on the position of the rudder assist mechanism 10 (i.e., left rudder deflection, neutral rudder deflection or right rudder deflection), the control rod 60 forms an arm b with the center of the rudder torque tube 12. The arm b is responsible for the +/− hinge moment (HM) of the rudder torque tube 12.

Figure 3A:
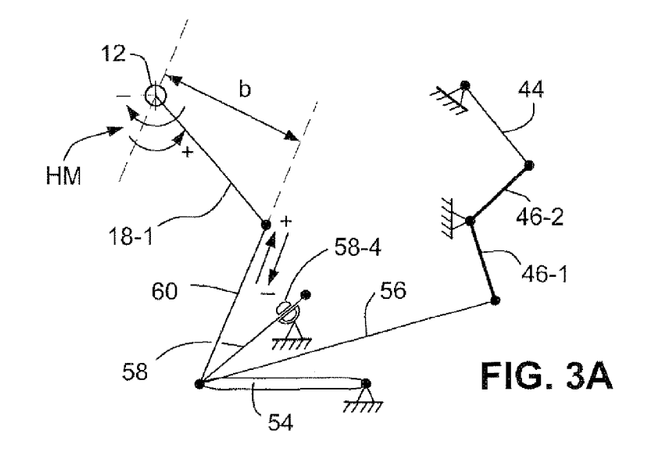
FIGS. 3A through 3D are schematic illustrations showing the general operation of the rudder assist mechanism and its over-the-center functions for a right rudder deflection, a neutral rudder deflection, rudder deflection within a predetermined "dead zone" and left rudder deflection, respectively.

Therefore if the total spring force is positive (i.e., the force of the paired tension springs 14-4 overcomes the force of the compression spring 14-5), a clockwise hinge moment HM of the rudder control rod RCR will occur. Such a hinge moment HM is considered positive (+). This positive hinge moment HM+is produced in the rudder torque tube 12 when the lower end 18-1 of torque tube bell crank 18 is traveling rightward (i.e., pivots in an anticlockwise direction) as depicted in FIG. 3A. Otherwise, the force of the compression spring 58 overcomes the force of the paired tension springs 56 and the total spring force is then considered negative (−). In this case an anticlockwise (considered negative hinge moment HM) pivotal movement is produced in the rudder control rod RCR due to clockwise pivoting of the rudder torque tube 12 by movement of the lower end 18-1 of the bell crank 18 leftward as viewed in FIGS. 3A-3D.

Figure 3B:
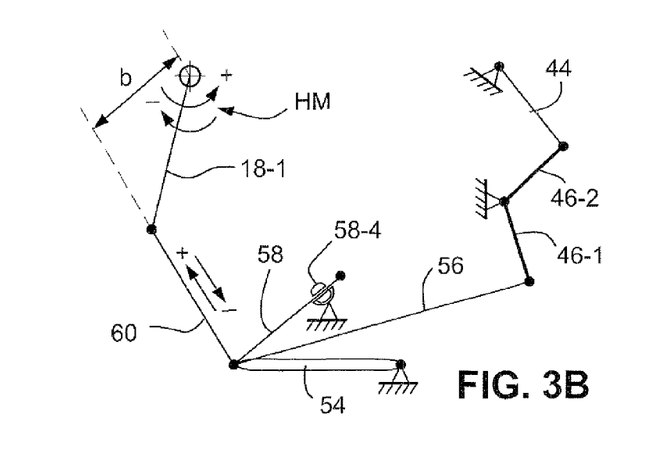

The same reasoning as discussed above can be used for the lower end 18-1 of the torque tube bell crank 18 traveling to the left position, although the total spring force and the hinge moments produced in the rudder torque tube have an opposite sign. Such a condition is shown in FIG. 3B.

Figure 3C:
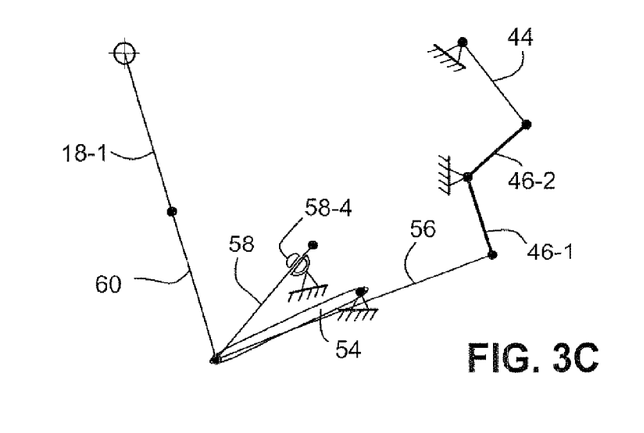
Figure 3D:
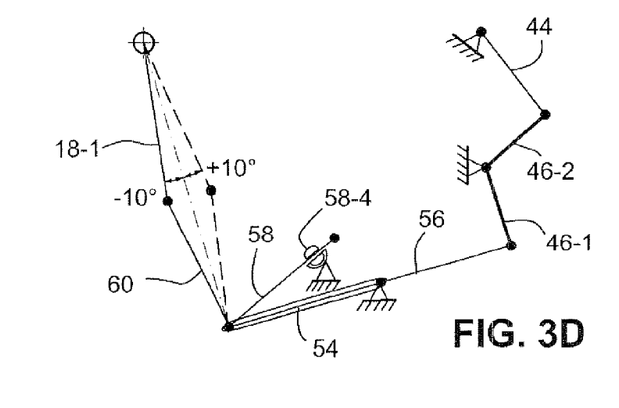

For the neutral (sometimes referred to as a null or over-the-center) position as shown in FIG. 3C, the arm b between the control rod 60 and the rudder torque tube 12 center is zero. As such, there is no hinge moment HM produced by the rudder assist mechanism 10 when in such a state. If a range of rudder surface deflections of, for example +/−10° occurs, then the arm b formed by the mechanism 10 and the hinge moment HM is neglected. Consequently, for such a predetermined rudder deflection range (which range may be more or less than the exemplified +/−10°), the forces imparted to the rudder control system RC by the rudder assist mechanism 10 is essentially null. In such a case, this region of the rudder assist mechanism 10 will be termed a rudder "dead zone" in which no rudder assist function is provided. It will of course be appreciated that the aircraft designer may select the magnitude of such a rudder dead zone by engineered selection of the spring forces exhibited by the paired tension springs 56 and/or the compression spring 58 and/or the various linkages between such springs and the rudder torque tube 12. Providing a "dead zone" of +/−10° should therefore be considered exemplary only and thus nonlimiting to the present invention.

As noted briefly above, the rudder assist mechanism 10 is capable of operating in both thrust symmetry mode (TSM) and thrust asymmetry mode (TAM) conditions. Normally, the rudder assist mechanism 10 will be operating in a TSM mode in which case the actuator rod 44 will be fully extended. However, upon receipt of a signal indicative of a thrust asymmetry by the actuator unit 42 (e.g., from the FADEC system), the actuator rod 44 will be caused to fully retract thereby placing the rudder assist mechanism 10 in a TAM condition.

Figure 4A:
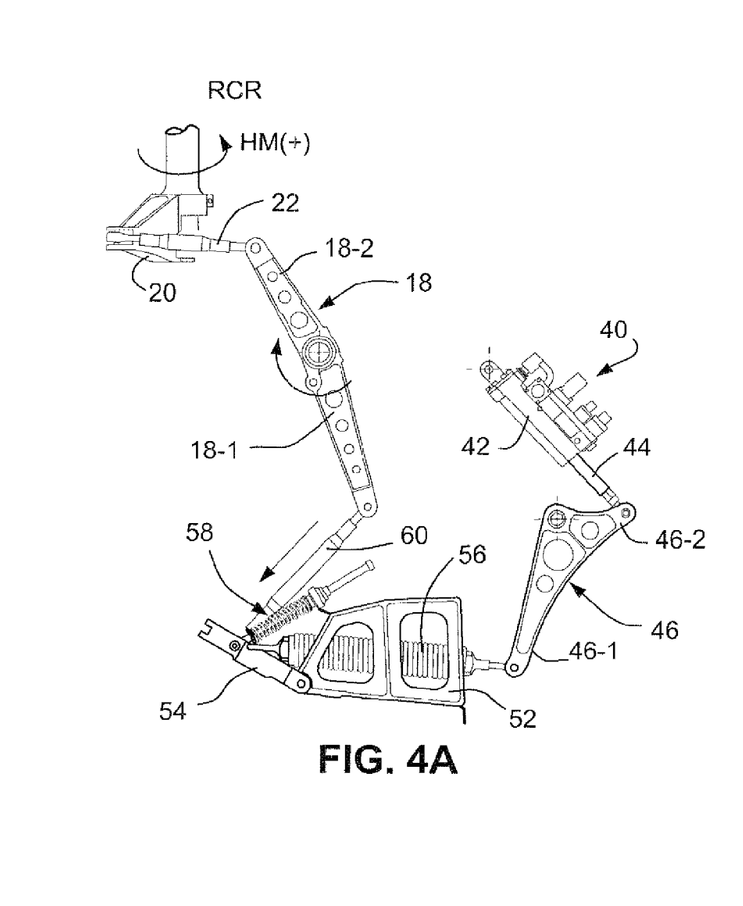
FIGS. 4A through 4C are elevational views of the rudder assist mechanism when operating in a thrust symmetry mode (TSM) condition in right rudder, neutral rudder and left rudder deflections, respectively.
Figure 4B:
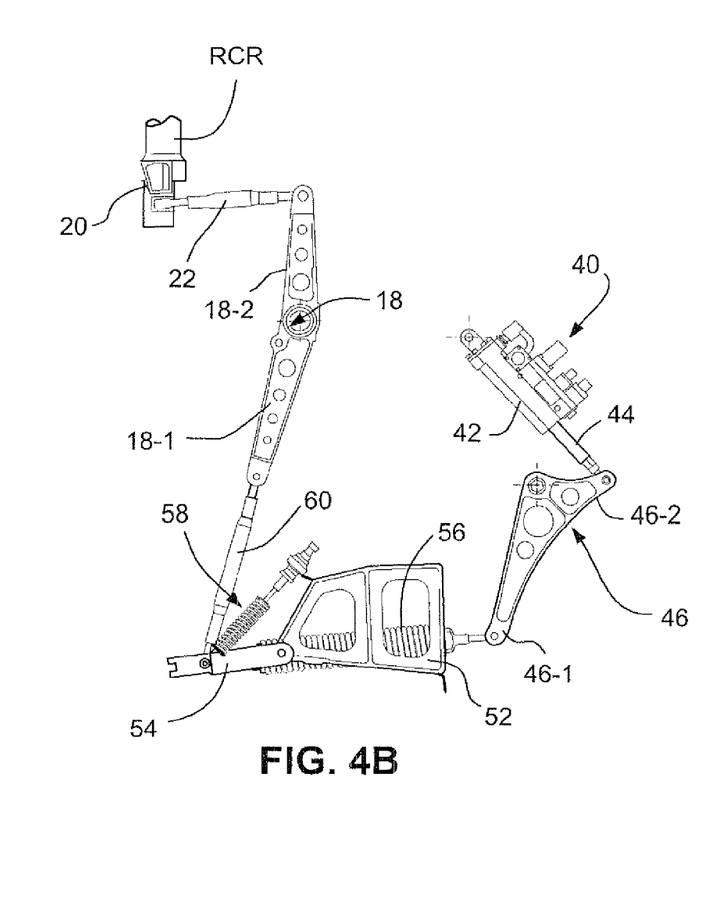
Figure 4C:
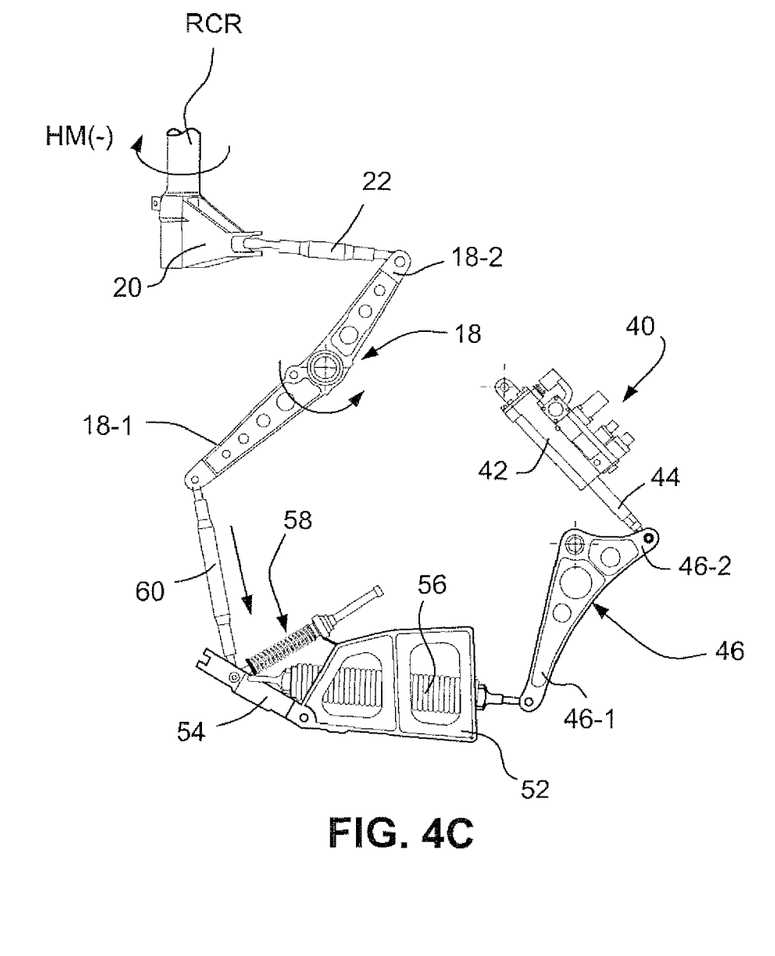

Accompanying FIGS. 4A-4C depict the rudder assist mechanism 10 in a TSM condition. In such a condition, the actuator rod 44 of the actuator unit 42 is fully extended which in turn causes, via the actuator bell crank 46, the paired tension springs 56 to be in a relatively relaxed state due to their shortened length (which in a preferred implantation is about 22.3 mm).

As was noted above, one implantation of the rudder assist mechanism 10 presents a dead zone of around +/−10° of rudder control surface RCS deflection. For values of typical rudder control surface RCS deflections greater than such dead zone range, for example between +/−10° and +/−25°, the rudder assist mechanism 10 applies a hinge moment in the rudder torque tube 12 (through the paired the tension springs 56) which can be felt by the pilot as a slight reduction in the force otherwise necessary to move the associated rudder pedal $RP_L$ or $RP_R$ (i.e., a slight reduction in the force to overcome the aerodynamic forces on the reversible rudder control system RC). For atypical deflections of the rudder control surface RCS, for example deflections greater than +/−25°, the effect of the compression spring 58 is more effective and as such the pilot will feel an increased force (e.g., as compared to the forced needed to otherwise overcome the aerodynamic forces on the reversible rudder control system RC) necessary to move the associated rudder pedal $RP_L$ or $RP_R$ and hence the rudder control surface RCS. This increment of increased pedal force is desired to limit the pilot effort to effect deflections of the rudder control surface RCS beyond a certain limit (e.g., greater than +/−25°) and thereby comply with aircraft certification requirements in that regard.

Figure 5A:
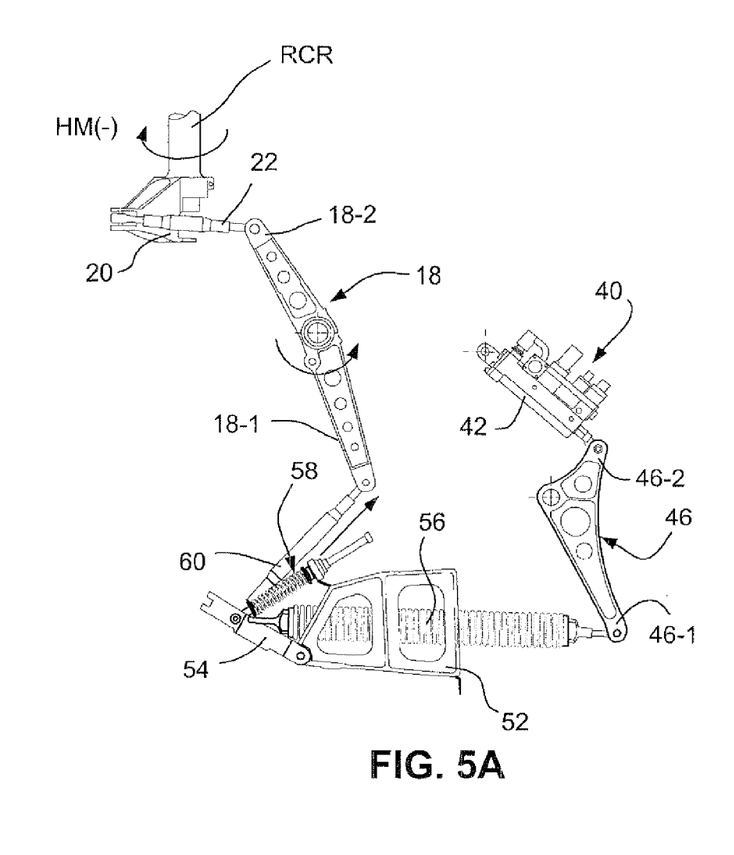
FIGS. 5A through 5C are elevational views of the rudder assist mechanism when operating in a thrust asymmetry mode (TAM) condition in right rudder, neutral rudder and left rudder deflections, respectively.
Figure 5B:
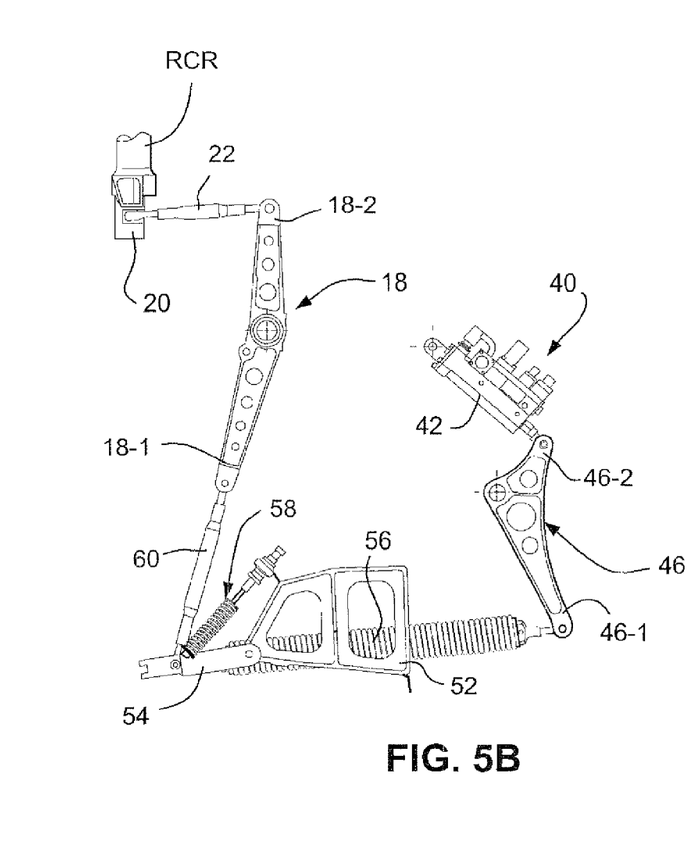
Figure 5C:
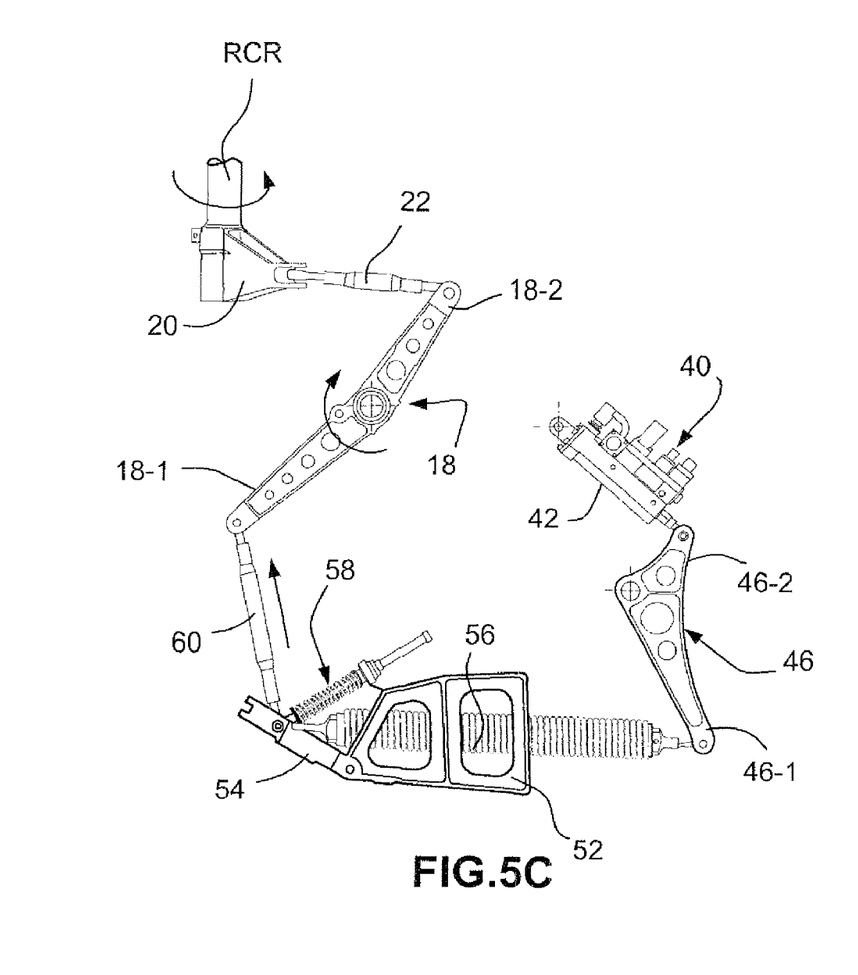

Accompanying FIGS. 5A-5C depict the rudder assist mechanism 10 in a TAM condition. In such a condition, the actuator rod 44 of the actuator unit 42 is fully retracted which in turn causes, via the actuator bell crank 46, the paired tension springs 56 to be in a relatively tensioned state due to their extended length (which in a preferred implantation is about 164.5 mm).

When in the TAM condition, the rudder assist mechanism 10 presents a dead zone, for example +/−10° of rudder control surface RCS deflections similar to the dead zone obtained when in the TSM condition. However, for values of surface deflections greater than the dead zone range (e.g., greater than +/−10°), the rudder assist mechanism 10 will introduce a hinge moment HM in the rudder torque tube 12 as described previously. This hinge moment will however be felt by the pilot as a reduction in the force necessary to move the rudder pedals RPL and RPR to overcome the increasing aerodynamic forces as the rudder deflection angle increases. In such situations, therefore, this reduction in the pilot force on the rudder pedals $RP_L$ and $RP_R$ will more easily allow the pilot to obtain an adequate side slip angle in the event of a thrust asymmetry (e.g., due to an engine failure).

Figure 6A:
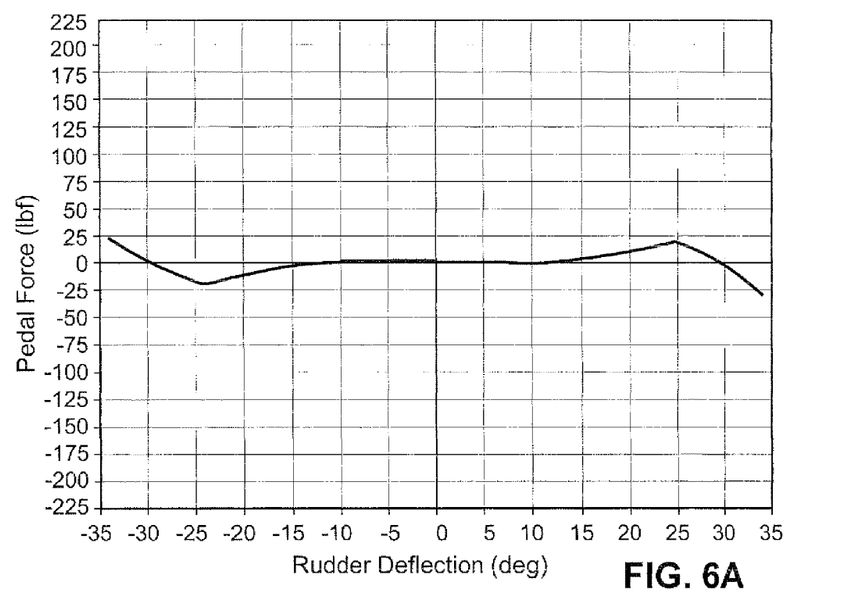
FIGS. 6A and 6B are graphical plots of rudder pedal force (lbf) versus rudder deflection (degrees) and the hinge moment (daN.mm) of the rudder torque tube versus rudder deflection (degrees), respectively, for the rudder assist mechanism operating in a TSM condition.
Figure 6B:
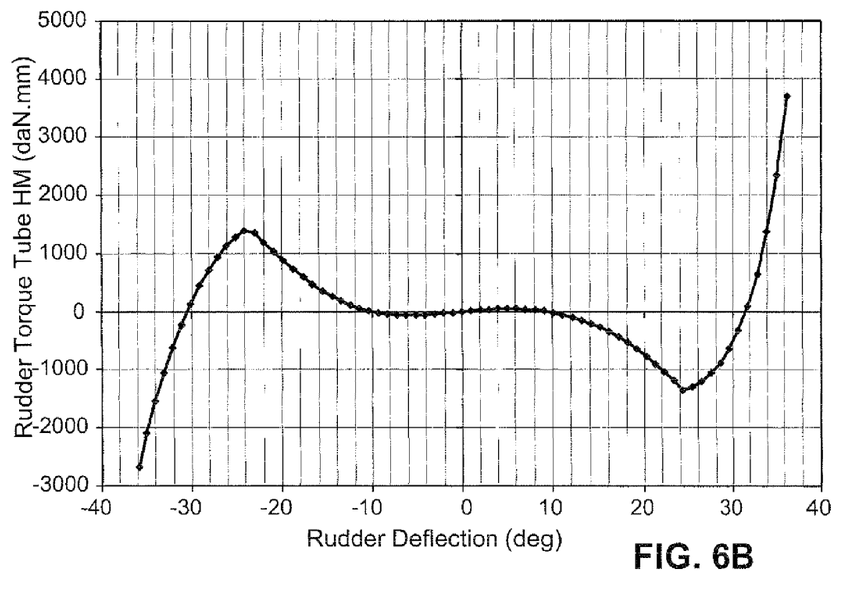

A graph of pedal force (lbf) versus deflection of the rudder control surface RCS (degrees) for the rudder assist mechanism operating in a TSM condition is depicted in FIG. 6A. The hinge moment HM (daN.mm) versus deflection of the rudder control surface RCS (degrees) produced in the rudder torque tube by the rudder assist mechanism in a TSM condition is depicted graphically in FIG. 6B. As can be seen from the graphical presentations, a slight change (increase) in rudder force and continual change of rudder torque tube HM is evident when operating in a TSM condition using typical deflections of the rudder control surface RCS outside the dead zone of +/−10° but within the deflection limits of +/−25°. Upon exceeding deflections of +/−25°, however, sharp reversal occurs thereby effectively increasing the pedal force required for further rudder deflection thereby providing an effective deflection stop.

Figure 7A:
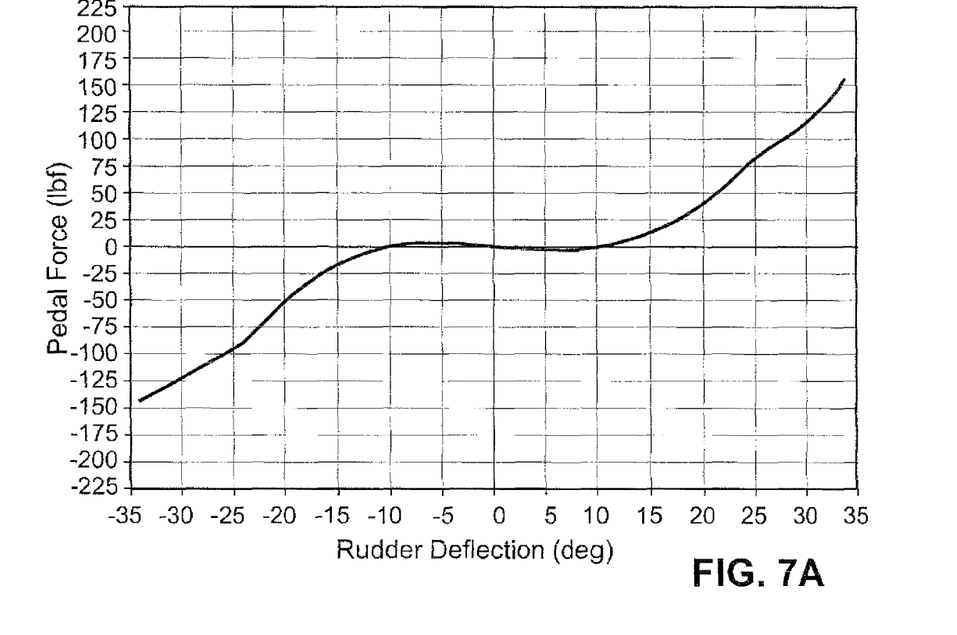
FIGS. 7A and 7B are graphical plots of rudder pedal force (lbf) versus rudder deflection (degrees) and the hinge moment (daN.mm) of the rudder torque tube versus rudder deflection (degrees), respectively, for the rudder assist mechanism operating in a TAM condition.
Figure 7B:
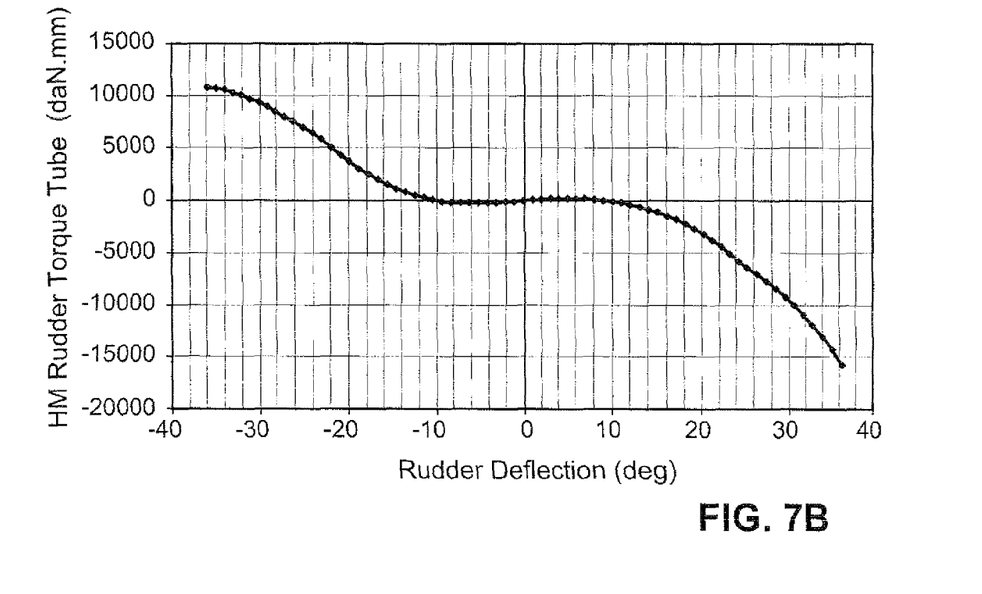

In the case of a TAM condition, however, accompanying FIGS. 7A and 7B reveal that a similar dead zone of +/−10° deflection of the rudder control surface RCS is present. For values of rudder surface deflection greater than +/−10°, however, the mechanism will introduce a hinge moment HM in the rudder torque tube 12 which can be felt by the pilot as a reduction in the force necessary to move the associated pedal $RP_L$ or $RP_R$ as the angle of the rudder control surface RCS increases even an atypical rudder deflection of greater than +/−25°. This reduction in the pilot force required to operate the rudder control surface RCS is necessary to comply with the maximum acceptable pilot force from the certification requirement to reach an adequate sideslip angle in case of an asymmetrical thrust condition, for example, upon the occurrence of an engine failure.

While the rudder assist mechanism 10 has been described in connection with a rudder control system employing physical cables, it should of course be realized that the present invention and the implantation described herein of the same may alternatively be employed in so-called "fly by wire" systems wherein suitable electronic circuitry and/or servo motors provide the pilot with the appropriate synthesized feed-back aerodynamic "feel" of the aircraft control surfaces during flight.

Thus, while a presently preferred embodiment has been described in connection with what is presently considered to be the most practical and preferred form thereof, it is to be understood that such a disclosed embodiment is not limiting to the appended claims. As such, the appended claims are intended to cover various modifications and equivalent arrangements included within the spirit and scope of thereof.

The invention claimed is:

1. A rudder assist mechanism for operable interconnection with a rudder control system by which manual pilot inputs cause an aircraft rudder control surface to be moved through right and left deflection angles, the rudder assist mechanism comprising:
   a control spring assembly; and
   a linkage assembly which operably connects the control spring assembly to the rudder control system, the linkage assembly including a null position which defines a dead zone of rudder control surface deflection within a selected range of right and left rudder control surface deflection angles whereby substantially no spring force of the control spring assembly is transferred to the rudder control system, and
   an actuator unit which is operably capable of moving the control spring assembly and the linkage assembly connected thereto between a thrust symmetrical mode (TSM) condition and into a thrust asymmetrical mode (TAM) condition in response to receiving a signal from an engine monitoring system of an abnormal engine thrust condition, wherein
   (i) in response to the linkage assembly being moved by the actuator unit into the TSM condition, the linkage assembly causes the control spring assembly to exert right and left spring forces to the rudder control system at rudder deflection angles in excess of a predetermined maximum deflection angle to thereby establish a rudder deflection stop whereby additional manual pilot input to the rudder control system results in substantially no additional rudder deflection beyond the predetermined maximum deflection angle, and wherein
   (ii) in response to the linkage assembly being moved by the actuator unit into the TAM condition, the linkage assembly prevents the right and left spring forces from being exerted by the control spring assembly to the rudder control system at rudder deflection angles in excess of the predetermined maximum deflection angle to thereby allow rudder deflection beyond the predetermined maximum deflection angle in response to additional manual pilot input to the rudder control system.

2. A rudder assist mechanism as in claim 1, further comprising an engine monitoring system operably connected to the actuator unit for issuing a signal to the actuator unit indicative of the abnormal thrust condition, wherein in response to receiving the signal from the engine monitoring system, the actuator unit responsively moves the spring and linkage assemblies from the TSM condition to the TAM condition.

3. A rudder assist mechanism for operable interconnection with a rudder control system by which manual pilot inputs cause an aircraft rudder control surface to be moved through right and left deflection angles, the rudder assist mechanism comprising:
   an actuator unit which causes the rudder assist mechanism to assume one of a thrust symmetrical mode (TSM) condition and a thrust asymmetrical mode (TAM) condition in response to a signal from an engine monitoring system indicative of an abnormal engine thrust condition;
   a control spring assembly which includes (i) a housing, (ii) a support fork pivotally connected to the housing, (iii) a tension spring having one end pivotally connected to the support fork and an opposite end connected operably to the actuator unit, and (iv) a compression spring having one end pivotally connected to the support fork and an opposite end journally connected to the housing;
   a linkage assembly which operably connects the control spring assembly to the rudder control system; and
   a control rod pivotally interconnecting the support fork and the rudder control system, wherein
   (i) in the TSM condition the linkage assembly causes the control spring assembly to exert right and left spring forces to the rudder control system at rudder deflection angles in excess of a predetermined maximum deflection angle to thereby establish a rudder deflection stop whereby additional manual pilot input to the rudder control system results in substantially no additional rudder deflection beyond the predetermined maximum deflection angle, and wherein
   (ii) in the TAM condition, the linkage assembly prevents the right and left spring forces from being exerted by the control spring assembly to the rudder control system at rudder deflection angles in excess of the predetermined maximum deflection angle to thereby allow rudder deflection beyond the predetermined maximum deflection angle in response to additional manual pilot input to the rudder control system.

4. A rudder assist mechanism as in claim 3, wherein each of the tension spring, the compression spring and the control rod is pivotally connected at a common pivot axis to the support fork.

5. A rudder assist mechanism as in claim 3, wherein the control spring assembly comprises a pair of tension springs each of which has one end connected pivotally to the support fork and an opposite end connected operably to the actuator unit.

6. A rudder assist mechanism as in claim 3, wherein the actuator unit includes a linearly reciprocal actuator rod, and an actuator bell crank connected at one end to the actuator rod and at an opposite end to the compression spring.

7. An aircraft comprising:
   a rudder control surface;

a reversible rudder control system operably connected to the rudder control surface to provide physical feedback to a pilot in command of the rudder control surface and which allows the rudder control surface to be moved through right and left deflection angles in response to manual pilot inputs; and a rudder assist mechanism connected operably to the rudder control system, wherein the rudder assist mechanism comprises, (i) a control spring assembly; and (ii) a linkage assembly which operably connects the control spring assembly to the rudder control system, the linkage assembly including a null position which defines a dead zone of rudder control surface deflection within a selected range of right and left rudder control surface deflection angles whereby substantially no spring force of the control spring assembly is transferred to the rudder control system, (iii) an actuator unit which is operably capable of moving the control spring assembly and the linkage assembly connected thereto between a thrust symmetrical mode (TSM) condition and into a thrust asymmetrical mode (TAM) condition in response to receiving a signal from an engine monitoring system of an abnormal engine thrust condition, wherein in response to the linkage assembly being moved by the actuator unit into the TSM condition, the linkage assembly causes the control spring assembly to exert right and left spring forces to the rudder control system at rudder deflection angles in excess of a predetermined maximum deflection angle to thereby establish a rudder deflection stop whereby additional manual pilot input to the rudder control system results in substantially no additional rudder deflection beyond the predetermined maximum deflection angle, and wherein in response to the linkage assembly being moved by the actuator unit into the TAM condition, the linkage assembly prevents the right and left spring forces from being exerted by the control spring assembly to the rudder control system at rudder deflection angles in excess of the predetermined maximum deflection angle to thereby allow rudder deflection beyond the predetermined maximum deflection angle in response to additional manual pilot input to the rudder control system.

8. An aircraft as in claim 7, further comprising an engine monitoring system for determining an abnormal engine thrust condition of the aircraft and for issuing a signal to the actuator unit, wherein in response to receiving the signal from the engine monitoring system, the actuator unit moves the rudder assist mechanism between the TSM condition and into the TAM condition.

9. An aircraft as in claim 7, wherein the control spring assembly comprises (a) a housing, (b) a support fork pivotally connected to the housing, (c) a tension spring having one end pivotally connected to the support fork and an opposite end connected operably to the actuator unit, and (d) a compression spring having one end pivotally connected to the support fork and an opposite end journally connected to the housing, and wherein the rudder assist mechanism further comprises a control rod pivotally interconnecting the support fork and the rudder control system.

10. An aircraft as in claim 9, wherein each of the tension spring, the compression spring and the control rod is pivotally connected at a common pivot axis to the support fork.

11. An aircraft as in claim 10, wherein the control spring assembly comprises a pair of tension springs each of which has one end connected pivotally to the support fork and an opposite end connected operably to the actuator unit.

12. An aircraft as in claim 9, wherein the actuator unit includes a linearly reciprocal actuator rod, and an actuator bell crank connected at one end to the actuator rod and at an opposite end to the compression spring.

13. An aircraft as in claim 12, wherein the actuator rod is reciprocally movable between an extended position which responsively causes the rudder assist mechanism to assume the TSM condition, and a retracted position which responsively causes the rudder assist mechanism to assume the TAM condition.

14. A method of providing rudder assist to a rudder control system by which manual pilot inputs cause an aircraft rudder control surface to be moved through right and left deflection angles, the method comprising the steps of:

(a) providing a rudder assist mechanism comprised of a control spring assembly and a linkage assembly; and (b) operably interconnecting the control spring assembly to the rudder control system with a linkage assembly so as to allow the linkage assembly which includes a null position which defines a dead zone of rudder control surface deflection within a selected range of right and left rudder control surface deflection angles whereby substantially no spring force of the control spring assembly is transferred to the rudder control system;

(c) monitoring an aircraft engine performance parameter and issuing a signal in response to detection of an abnormal engine thrust condition to an actuator unit operably capable of moving the control spring assembly and the linkage assembly connected thereto between a thrust symmetrical mode (TSM) condition and into a thrust asymmetrical mode (TAM) condition;

(d) causing the control spring assembly when in the TSM condition to exert right and left spring forces to the rudder control system at rudder deflection angles in excess of a predetermined maximum deflection angle to thereby establish a rudder deflection stop whereby additional manual pilot input to the rudder control system results in substantially no additional rudder deflection occurring beyond the predetermined maximum deflection angle; and (e) preventing the control spring assembly when in the TAM condition from exerting the right and left spring forces to the rudder control system at rudder deflection angles in excess of the predetermined maximum deflection angle to thereby permit rudder deflection beyond the predetermined maximum deflection angle in response to additional manual pilot rudder input to the rudder control system.

15. A method as in claim 14, further comprising monitoring engine thrust conditions and issuing a signal to the actuator unit indicative of an abnormal thrust condition so as to cause the actuator unit to responsively move the spring and linkage assemblies from the TSM condition to the TAM condition.

* * * * *